Patented Oct. 4, 1949

2,483,972

UNITED STATES PATENT OFFICE 2,483,972

POLYSILMETHYLENE AND ITS PRODUCTION

John T. Goodwin, Jr., Pittsburgh, Pa., assignor to Dow Corning Corporation, Midland, Mich., a corporation of Michigan No Drawing. Application April 20, 1948, Serial No. 22,255

In Great Britain July 1, 1947

4 Claims. (Cl. 260—448.2)

The present invention relates to the production of polymeric fluids which have the fundamental repeating structure —$CH_2SiR_2$— and to the fluids so produced.

In the history of the organosilicon compounds, two principal types of compounds containing more than one silicon atom have heretofore been described. In one of these types, the silicon atoms are linked directly to each other. These are the so-called polysilanes, heretofore described by Kipping. The present organosilicon industry is based upon the siloxanes, which are materials in which the silicon atoms are linked through oxygen atoms. There has been mention in the literature heretofore of organosilicon halides containing a plurality of silicon atoms in which the silicon atoms are linked by large divalent organic radicals and the remaining valences of the silicon atoms are satisfied by chlorine.

Objects of the present invention are to produce organosilicon compounds in which the silicon atoms are linked through methylene bridges.

In accordance with the process of the present invention, compounds of this type are produced by reacting with an alkali metal a compound of the type $XCH_2SiR_2Y$ in which X represents a halogen, preferably chlorine or bromine, R represents monovalent hydrocarbon radicals bonded to the silicon by carbon to silicon bonding, and Y represents alkoxyl or halogen, preferably ethoxyl, chlorine or bromine.

The reaction is conducted with the reactant in liquid phase. The alkali metal may be either in solid phase or liquid phase, though the latter is preferred, as the process proceeds much more rapidly under such conditions. By this method, materials are produced in which the general structure of the molecule is alternating silicon and carbon atoms and in which monovalent hydrocarbon radicals are linked to each silicon atom. The reaction which is obtained produces this structure preferentially. This preferential reaction is not the necessary result, since it might be expected that a Wurtz type reaction would occur in which the carbons of two halogenomethyl radicals would become linked together to give ethylenic bridges between silicon atoms. Another type reaction which could occur would involve the substitution of hydrogen for the halogen in the halogenomethyl radicals, such as occurs in the reaction of chlormethyl trimethyl silane with sodium in the presence of a hydrocarbon solvent, with the production of tetramethyl silane.

The reactant for the present process may be made in a variety of ways. Thus, in the case of chloromethyl dimethyl silicon chloride, this material may be produced by the direct chlorination of trimethyl silicon chloride as described in the literature. The equivalent ester may be produced by the substitution of an alkoxyl radical for the chlorine radical by reacting the above chloride with the desired alcohol. Alternatively, these same materials may be produced by chlorinating methyl silicon trichloride to give chloromethyl silicon trichloride, which may then be reacted with a methyl Grignard reagent to give the chloromethyl dimethyl silicon chloride. In case other hydrocarbon radicals than methyl radicals are desired, the latter of the above methods may be employed. That is, the chloromethyl silicon trichloride may be reacted with other Grignard reagents than methyl Grignard, as for instance, with an ethyl Grignard or higher alkyl Grignard, such as octadecyl Grignard. Likewise, in this process, aryl groups can be substituted by the use of appropriate Grignards, such as phenyl Grignard.

The reaction is conducted by contacting the alkali metal and the silicon derivative with the latter in liquid phase. Thus, it is possible to add the alkali metal in cut pieces to the reactant at room temperature or at somewhat elevated temperature. In this case, the reaction proceeds relatively slowly unless the temperature is elevated to above the melting point of the alkali metal. A preferred method of conducting the reaction is to suspend the alkali metal in a hydrocarbon boiling above the melting point of the alkali metal. The suspension is maintained at a temperature above the melting point of the alkali metal. The organic reactant is then added to the suspension. Very rapid reaction occurs under these conditions. It is advantageous in this mode of operation to employ low melting alloys of the alkali metals, such as the sodium and potassium eutectic. If desired, sodium amide may be used.

By this process high molecular weight mixtures are obtained which it has been found virtually impossible to separate into pure components. The product is principally polymers which have the formula $(CH_2SiR_2)_n$. This is indicated by the negligible chlorine content of the product.

The reaction product is of considerably varying boiling point. As obtained, the product is a fluid. The lower molecular weight materials present may be removed by distillation. Depending upon how much of the lower molecular weight materials is removed, the average molecular weight of the residue will vary. The residue, when a large portion of the reaction product is removed by distillation, may have a sufficiently high molecular weight that it is a fluid at room temperature having substantially no flow but which softens somewhat upon heating. The viscosity of the various cuts which may be taken varies, the lower boiling materials having lower viscosities.

The temperature viscosity slope of the reaction product lies between that of hydrocarbon lubricating oils and that of organo polysiloxane type of lubricating oil. With respect to the overhead fractions of the reaction product, the temperature viscosity slope is approximately the same as in the case of the organo polysiloxane lubricants. Lubrication tests on these materials show that as lubricants they are approximately as good as high grade petroleum lubricants and as the organo polysiloxane lubricants. It is to be observed, in this connection, that the products hereof in which the organic radicals are methyl radicals are very much better lubricants than are the equivalent organo polysiloxane fluids in which the organic radicals are methyl groups.

These products are likewise of utility as hydraulic fluids, damping fluids, waterproofing fluids and as electrical insulating fluids, such as transformer oils.

Examples

*Example 1.*—45.5 parts by weight of sodium were added to 193.3 parts of $ClCH_2Si(CH_3)_2OC_2H_5$ while maintaining the latter under reflux. The sodium was added over a period of one hour. The reaction occurs sufficiently rapidly that the sodium is used up as added. The reaction is exothermic. The heat of reaction was removed by the coolant in the reflux condenser. The reaction product was a slurry in which the solids were assumed to be sodium chloride and sodium ethoxide. The product was diluted with benzene and filtered. The filtrate was then distilled, first to remove the benzene and then at 26 mm. pressure to remove the lower boiling portion of the product. 40 parts of a fluid distillate were obtained which boiled in the range from 55° to 145° C. at 26 mm. pressure. The residue, of which 80 parts were obtained, was a fluid which appeared somewhat gel like. Upon extraction again with benzene to remove residual sodium ethoxide, a thin oil was obtained which had an average molecular weight of 562. Analysis showed the following:

| | Found |
|---|---|
| Per cent Si | 33.11 |
| $d_{25}$ | 0.9105 |
| $nd_{25}$ | 1.4584 |
| Mol. wt. | 562 |
| $C_2H_5O$ | 5.82 |

*Example 2.*—46 parts by weight of sodium were added to 286 parts of $ClCH_2Si(CH_3)_2Cl$ at a temperature of 110° to 120° C. under reflux over a period of three hours. The exothermic reaction occurred vigorously. The product was diluted with 500 parts of benzene and filtered to remove the salt. The benzene was distilled from the filtrate to give 150 parts of an oil which had the fundamental structure of alternating silicon and carbon atoms, and which had hydrolyzable chlorine on silicon atoms due to the relative proportions of the initial reactants. This fluid product was employed to make a fluid having both methylene and oxygen bridges between silicon atoms, by hydrolyzing and condensing it with an excess of alcoholic KOH.

*Example 3.*—69 parts by weight sodium were added to 286 parts of $ClCH_2Si(CH_3)_2Cl$ in 500 parts of xylene at 110° C. The reaction occurred vigorously. The reaction product was filtered and the salt removed was washed with an additional 200 parts of xylene. The xylene was strip distilled leaving about 105 parts of the fluid product having alternating silicon and carbon atoms. This was distilled at atmospheric pressure to remove the low boiling components. This distillation yielded 30 parts of product of boiling range from 150° to 250° C. The viscosity of the residue depends upon how much of the low boiling components is removed and ranges between about 300 and 400 centistokes at 25° C. The viscosity range of the distillate is from about 1 to about 10 centistokes depending upon the depth of the cut.

The residue is substantially entirely distillable under vacuum at temperatures above 350° C., which indicates the extreme thermal stability of these materials.

| | Found on Residue | Theory for $[CH_2Si(CH_3)_2]_n$ |
|---|---|---|
| Per cent Si | 36.5 | 39 |
| Per cent C | 50.2 | 50.0 |
| C/Si atomic ratio | 3.18 | 3.0 |
| Mol. Wt. | 850 | |

*Example 4.*—The same product was prepared by adding 460 parts by weight of sodium to 2400 parts of toluene and heating to melt the sodium. 1430 parts of $ClCH_2Si(CH_3)_2Cl$ were added at a rate to maintain the temperature between 105° and 110° C. with the cooling available. An additional 800 parts of toluene were then added. The mixture was maintained at 110° C. for an additional 2 hours. The mixture was filtered. The filter cake was washed with toluene. Toluene was strip distilled from the reaction product. The product was distilled to obtain a plurality of cuts of materials having alternating silicon and carbon atoms and having two methyl radicals bonded to each silicon.

*Example 5.*—68 parts by weight of chloro(chloromethyl)methyl-phenylsilane were added to 16 parts of sodium in 240 parts of toluene at such a rate that the reaction mixture was maintained at a temperature of 105° C. during the addition with the amount of cooling available. Following the addition of all of the silane, the reaction product was maintained at 105° C. for one hour. The product was filtered and the salt so removed was washed with toluene. The toluene washes were added to the product from which the toluene was then stripped and the residue distilled. A very small cut of low boiling product was obtained by distillation at 25 mm. The major product remained as a residue which was a yellow viscous oil at room temperature. Analysis showed the product to contain 20.8 percent silicon. The expected product

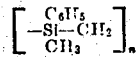

by computation would contain 20.9 percent silicon.

*Example 6.*—92 parts by weight of butylchloro(chloromethyl)methyl-silane were added to 23 parts of molten sodium under 195 parts of toluene. The addition was made at a rate to maintain the sodium in a molten state. The evolution of heat and appearance of a blue-black color demonstrated that reaction was occurring. The reaction product was filtered to remove salt which was formed, which salt was washed with toluene. The toluene washes were added to the filtrate. The composited filtrate and washes were stripped and the residue was fractionated under vacuum. The following cuts were obtained.

| Temperature, ° C. | ml. | P$_{mm}$ |
|---|---|---|
| 127.8–200.2 | 11 | 24.5 |
| 200.2–239 | 10 | 24.5 |
| 242 –242.5 | 10 | 24.5 |
| 248 –260 | 9 | 5–3 |

An oily residue which remained amounted to 27.4 ml. which had a density of 0.9135. The products obtained in this run were polymers of the structure

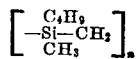

That which is claimed is:

1. The method which comprises reacting a compound of the type XCH$_2$SiR$_2$Y in which X represents a halogen and Y represents a substituent of the group consisting of alkoxyl and halogen with an alkali metal whereby to produce polymers containing polymer units of the type (CH$_2$SiR$_2$) in which R represents a radical of the group consisting of phenyl and alkyl.

2. The method in accordance with claim 1 in which R represents methyl.

3. The method in accordance with claim 1 in which one R linked to the silicon atom represents methyl and the other R represents butyl.

4. The method in accordance with claim 1 in which one R linked to the silicon represents methyl and the other R linked to the silicon represents phenyl.

JOHN T. GOODWIN, JR.

REFERENCES CITED

The following references are of record in the file of this patent:

UNITED STATES PATENTS

| Number | Name | Date |
|---|---|---|
| 2,352,974 | Rochow | July 4, 1944 |

OTHER REFERENCES

Rochow: "Chemistry of the Silicones" (1946), pages 46–49, Wiley and Sons, publishers.

Goodwin: "Jour. Am. Chem. Soc.," vol. 69 (Sept. 1947), page 2247.